Jan. 5, 1960 A. H. YOUMANS 2,920,204
APPARATUS FOR SIMULTANEOUS DETECTION OF
THERMAL AND EPITHERMAL NEUTRONS
Filed Sept. 4, 1956 2 Sheets-Sheet 1
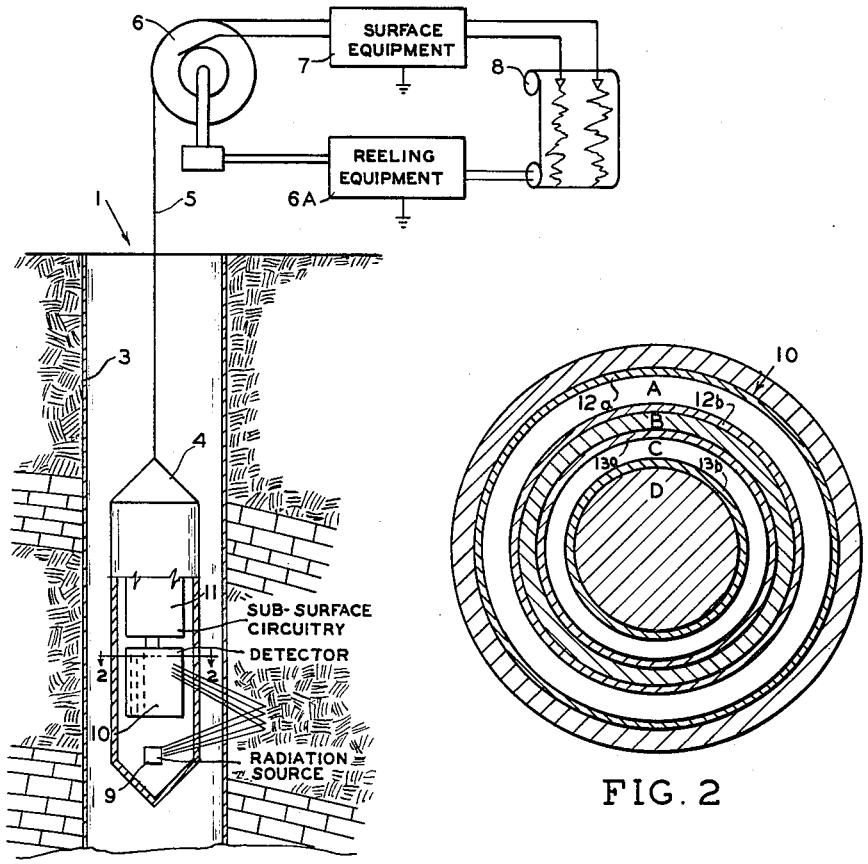
FIG. 1
FIG. 2
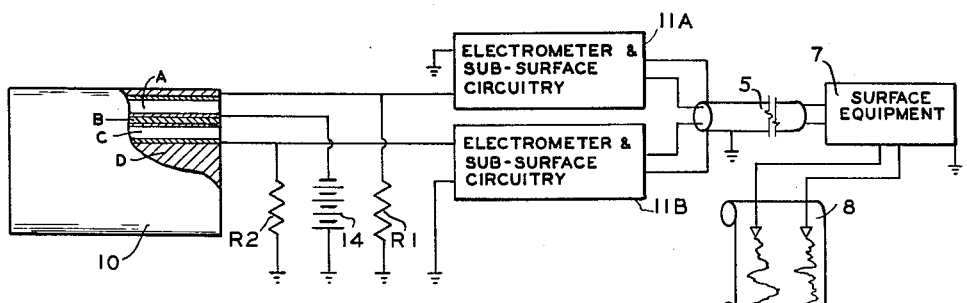
FIG. 3
*INVENTOR.*
ARTHUR H. YOUMANS
BY
Robert K. Schumecher
ATTORNEY Jan. 5, 1960  A. H. YOUMANS  2,920,204
APPARATUS FOR SIMULTANEOUS DETECTION OF
THERMAL AND EPITHERMAL NEUTRONS
Filed Sept. 4, 1956  2 Sheets-Sheet 2

INVENTOR.
ARTHUR H. YOUMANS

BY
ATTORNEY

United States Patent Office 2,920,204
Patented Jan. 5, 1960

2,920,204

APPARATUS FOR SIMULTANEOUS DETECTION OF THERMAL AND EPITHERMAL NEUTRONS

Arthur H. Youmans, Tulsa, Okla., assignor to Well Surveys, Incorporated, a corporation of Delaware Application September 4, 1956, Serial No. 607,619

7 Claims. (Cl. 250—83.1)

This invention relates to radioactivity well logging, particularly neutron well logging and more particularly to a novel apparatus for use in conjunction therewith.

Commercial well logging practices include measurements of thermal neutrons in a bore hole while the formations surrounding the bore hole are being bombarded with fast neutrons. Such measurements provide information concerning certain of the variables of the formations, particularly fluid content. This is because fast neutrons are peculiarly influenced by hydrogen. However, the measurement is also sensitive to the nuclear properties of other elements, especially their thermal neutron capture cross section. Conventional thermal neutron well logs are therefore influenced greatly by the relative abundance of such thermal neutron capturing materials as chlorine, boron, gadolinium, and iron. Epithermal logs might therefore be preferred to indicate fluid content. However even the best measurement of the prior art indicate the relative presence of both oil and water whereas it is desirable to find oil unambiguously. Since the water found deep in the ground is normally salty, containing a relatively large amount of chlorine, it is possible differentiate between oil and water on the basis of chlorine content. In accordance with the instant invention, thermal and epithermal neutron well logs are made simultaneously and correlated, thus permitting relatively unambiguous identification of oil as a fluid not containing chlorine. The correlation may be effected by obtaining a ratio of the two measurements, by making a differential measurement, or merely by recording both measurements simultaneously upon the same recorder chart paper for comparison. In the case of differential measurements, the individual measurements should be normalized before subtraction or the sensitivities relatively adjusted so that the difference is relatively small at some selected formation.

In attempting to secure simultaneous thermal and epithermal neutron logs with equipment of the prior art, it would be necessary to position two radiation detectors either side by side or end to end. An undesirable geometrical error is caused to occur in the relative response of the two logs because of this physical displacement between the two detectors. If the logs are not run simultaneously, there is obviously even greater possibility of error.

The present invention obviates these errors by accomplishing the detection of both types of neutrons at the same point by exposing detectors of both types of neutrons to the same environment. There is thus provided an improved simultaneous log of thermal as well as epithermal neutrons. By eliminating the geometrical error, it is possible to make both types of logs under substantially identical conditions. Thus, each and every change in the relative deflection between the two logs will be due solely to variations in the relative thermal and epithermal neutron fluxes which are detected by the downhole instrumentation. These advantages are obtained by employing the apparatus of the present invention to make simultaneous measurements of thermal and epithermal neutron flux at the same point.

Accordingly, therefore, a primary object of this invention is to provide a novel apparatus for simultaneously obtaining an accurate log of both thermal and epithermal neutron flux.

Another object of this invention is to provide a system for making simultaneous measurements of thermal and epithermal neutron flux at substantially the same place.

Another object of this invention is to teach a novel combination of circuitry and components for detecting both thermal and epithermal neutrons in a well bore.

Another object of this invention is to provide a novel sub-surface detection system using ionization chambers in conjunction with electrometers to accomplish the simultaneous formulation of both thermal and epithermal neutron logs.

Another object of this invention is to teach a novel combination of subsurface circuits and components which includes a proportional counter of ionizing radiations co-acting with suitable pulse shaping circuitry.

A further object of this invention is to provide a novel combination of subsurface circuits and components which employs scintillation material with associated photomultiplier tubes acting in conjunction with suitable pulse shaping circuitry.

A still further object of this invention is to teach a novel structure for using a plurality of photomultiplier tubes with associated scintillation material in order to accomplish simultaneous logging of both thermal and epithermal neutrons.

Other and further objects and advantages of this invention will become apparent by reference to the following detailed description and drawings in which like numerals indicate like parts and in which:

Figure 1 shows diagrammatically the system for conducting a radioactivity well logging operation.

Figure 2 shows a sectional view of the radiation detector taken along the lines 2—2 in Figure 1, and looking in the direction of the arrows.

Figure 3 illustrates schematically the surface and subsurface circuitry and components used in conjunction with the ionization chamber embodiment of the invention.

Figure 4:
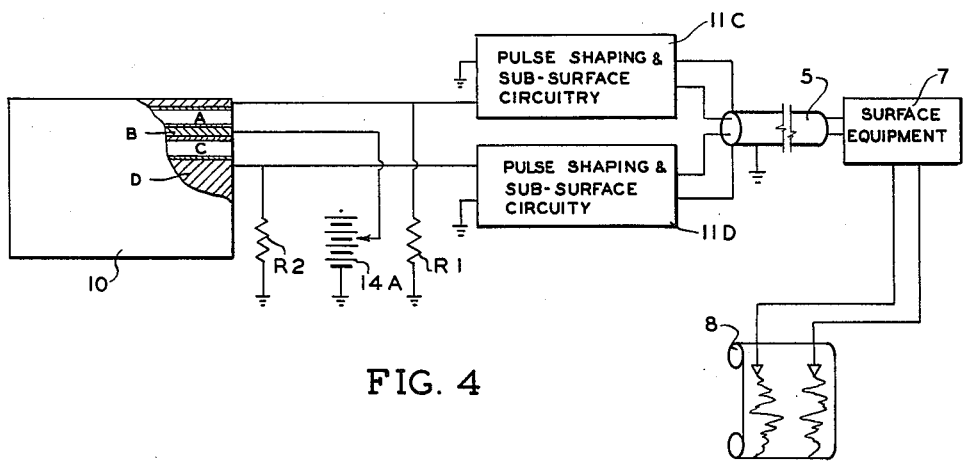
Figure 4 shows schematically the surface and subsurface circuitry and components used in connection with the aspect of the present invention which permits proportional counter response to incident radiation.

Turning now to the drawings, and more particularly to Figure 1 thereof, the numeral 1 indicates generally a well logging operation in which the well bore 3 is traversed by a downhole instrument 4.

The instrument 4 is raised or lowered by means of cable 5, which is characterized by ample mechanical strength and provided with suitable electrical conductors therewithin. The cable 5 passes over the pulley wheel 6, and is connected to provide electrical input signals to the surface equipment 7.

The direction of rotation of the pulley wheel 6, and the relative position of the instrument 4 are controlled by the reeling equipment 6A.

Recorder means 8 are operatively connected to the output of the surface equipment 7 and provide a permanent record of the data received in correlation with depth when the recorder chart position is controlled by reeling equipment 6A.

Returning now to the details of the downhole instrument 4, there may be provided a suitable source of radiations 9. The neutron source 9, in a manner well known to those skilled in the art, bombards the formations with fast neutrons, which are scattered and slowed down thereby.

The scattered neutrons impinge upon the radiation detector 10, which is characterized by the ability to simultaneously detect separately thermal as well as epithermal neutron flux. The signals emanating from detector 10 are fed to the subsurface circuitry 11 for suitable modification therein. The nature and purpose of the subsurface circuitry 11 will become clear as the detailed description of the invention proceeds.

Turning now to Figure 2, the constructional details of the novel detector 10 will now be discussed. Four concentric annular volumes are designated by the letters A, B, C and D. The inner volume D may be a solid cylinder as shown rather than annular.

The annular volume A comprises a filling of inert gas and acts to measure the thermal neutron flux. This outermost layer of inert gas responds to thermal neutron flux in a manner presently to be described. The boundary surfaces which enclose volume A are provided with coatings 12a and 12b. Coating 12a may be placed upon the outer housing of instrument 4. The substance employed for the coatings 12a and 12b may comprise boron which has been enriched with the boron-10($B^{10}$) isotope. The coating 12a should be of thickness of the order of magnitude of the path length of alpha particles emitted upon the capture of neutrons by boron-10. Thicker coatings reduce sensitivity by capturing neutrons without permitting ionizing particles to escape for detection, and thinner coatings will not capture as many neutrons even though permitting alpha particles to escape. Coating 12b may be thicker, for neutrons not captured in the thin layer must be stopped anyway and can have no effect upon volume A.

The annular volume C also comprises a filling of inert gas. The inner layer of inert gas C may measure either thermal or epithermal neutron flux. Or, alternatively, annulus C may measure both types of neutron flux in a manner which will be explained more fully below.

The boundary surfaces which enclose the annular volume C are provided with coatings 13a and 13b. Coating 13b should be as coating 12a. Coating 13a should be as coating 12b. The substance employed for these coatings may comprise boron which has been enriched with the boron-10($B^{10}$) isotope. It will be noticed that both the inner and the outer annular volumes of inert gas are provided with these isotope enriched coatings.

Approximately equal sensitivity to neutrons, and especially to thermal neutrons, characterizes these coated surfaces. The actual detection of the neutron flux within the respective volumes is accomplished by observing the ionization effected in the gas by alpha particles. The ionizing alpha particles are, as is well known to those skilled in the art, produced by the $B^{10}(n,\text{alpha})Li^7$ reaction. The instrumentation for detecting the ionization currents is discussed more fully later in this specification in connection with Figure 3.

The details of annular volumes B and D will now be described. Volume B is concentrically disposed with respect to the outer volume A, for the purpose of absorbing only thermal neutrons, and is composed of a material with a high thermal neutron capture cross section. As a result, epithermal neutrons will pass through volume B substantially unimpeded. The annular volume B may be formed of cadmium, gadolinium, dysprosium, samarium, boron, indium, chlorine and the like. If the material is not structurally sound, it may be placed on or between structural members. If boron is used, it must be thick enough that alpha particles produced upon neutron capture may not get through to act upon volume C. The reaction products upon neutron capture by the other elements mentioned are eliminated from measurement by the means disclosed below for other gamma rays.

The inner volume D shown in Figure 2 is preferably composed of a material which attenuates the energy of neutrons without capturing an appreciable number thereof. Element D may comprise a hydrogenous material such as paraffin or plastic. Heavy water, beryllium, lithium-7, carbon or other light elements or their compounds are satisfactory. If the material is not structurally sound, it may be contained by a structural member. The attenuation of neutrons without capture, prior to outward diffusion to volume C, is the function of the substance employed for volume D. The inner element D moderates the epithermal neutrons by this attenuation, and facilitates detection in the annular volume C.

Turning now to Figure 3, the novel instrumentation for observing and recording the simultaneously observed thermal and epithermal fluxes will now be described.

As earlier stated, ionization is produced in the inert gas volumes A and C by the $B^{10}(n,\text{alpha})Li^7$ reaction. Such ionization can be readily observed by applying an electrical potential between the peripheral surfaces of the respective volumes, and metering the ionization current directly. This, of course, amounts to measuring the ionization effects by the use of the electrical field placed across the respective gas volumes. The embodiment for accomplishing this is illustrated in Figure 3.

The voltage source shown diagrammatically by the number 14 is connected to apply the required potential difference to the volumes A and C within the detector 10. Ionizing currents occurring in the respective volumes complete their circuits back to source 14 via the resistors R1 and R2.

The resistors R1 and R2, respectively, may comprise the input resistors to a pair of vibrating condenser electrometers of the type disclosed in the publication Geophysics, vol. 17, No. 2, April 1952, p. 387, by Gilbert Swift, "Simultaneous Gamma-Ray and Neutron Logging."

Alternatively, it will be appreciated that any suitable type of electrometer circuitry may be employed equally well in measuring the output currents from the volumes A and C.

In Figure 3, the respective vibrating condenser electrometer circuitry is combined within the stages of subsurface circuitry 11A and 11B and forms a part thereof. As used in this context, the stages 11A and 11B may include suitable amplifying, wave shaping, and impedance matching circuitry for coupling the signal from stages 11A and 11B to the input terminals of the electrical conductors within cable 5. The cited article in Geophysics discloses suitable apparatus, particularly in Figure 4 thereof.

The signals are delivered uphole, via cable 5 to the surface equipment 7. The surface equipment 7 may include such conventional stages of amplification, wave shaping and the like as prove necessary or desirable, and no claim is made herein to the internal details thereof. Suitable surface apparatus is also disclosed in Figure 4 of the Geophysics article.

Recorder means 8 is connected to receive an input signal from surface equipment 7. The recorder 8 is of conventional design and the details thereof form no part of the present invention. Both signals may be recorded by means of plural trace recording, to render possible visual comparison of the correlation therebetween. Alternatively, it will be appreciated that the unit 8 may permanently record the single resultant of the thermal and epithermal signals, as compared within the surface equipment 7.

In making neutron measurements, it is necessary to take into account the gamma rays that are also necessarily present. The effect of gamma radiation may be reduced by heavy metal shielding. Also, the thickness of detector gas in volumes A and C is preferably such that alpha particles from the boron coating are barely stopped; then, gamma rays pass through virtually unimpeded and any electrons released in the volumes by gamma rays escape with relatively little ionization of the gas. Unless there are many more gamma rays than neutrons, the ionization current produced by gamma radiation may be neglected relative to that produced by the neutrons.

The present invention is not limited to continuous current operation as an ionization chamber detector with inert gases having moderate voltage requirements. In Figure 4 the connection for other types of operation is illustrated. More particularly, high voltage source 14A is employed in conjunction with a suitable gas mixture in volumes A and C. The proper correlation of the ingredients in the gas volumes A and C, with the value of voltage 14A, permits proportional counter operation. Thus, impingement of thermal and epithermal neutrons gives rise to the generation of a plurality of discrete electrical pulses.

These discrete pulses are developed as voltage pulses across the resistors R1 and R2. The resistors R1 and R2 serve as input elements to the pulse shaping and subsurface circuitry stages 11C and 11D, respectively. In Figure 4, the pulse shaping circuitry is combined within the subsurface stages 11C and 11D, and forms a part thereof. It will be appreciated that such conventional stages of pulse amplifying and modifying circuitry as prove necessary or desirable may be included within the pulse shaping circuitry disclosed herein. The units 11C and 11D may also include the conventional amplifying and modifying circuits commonly employed in pulse type systems. These units may contain conventional pulse height discriminators which may be adjusted to eliminate the small pulses due to gamma rays. This may be done in the manner of U.S. Patent No. 2,483,139 to Gerhard Herzog. The pulses passed by the discriminators may be shaped to be all the same. The resultant signals may then be sent to the surface for integrating and recording in a conventional manner.

In connection with the embodiments shown in Figure 2, Figure 3 and Figure 4, it should be mentioned that the inventive structure is not limited to the use of the enriched boron coating on the surfaces which bound the volumes A and C. Under some circumstances, the enriched boron coating may be dispensed with entirely. In its place, a surface coating of fissionable material such as uranium-235 may be employed. Then, the ionization chamber equipment shown in Figure 3 may be employed to meter the ionization currents produced by fission fragments as a measure of neutron flux. Or, the pulses in the gas caused by such fission fragments may be observed through proportional counter operation with the embodiment illustrated in Figure 4.

Instead of placing enriched boron or fissionable material on the bounding surfaces as a coating, suitable neutron reactive material may be distributed within the gas volumes A and C and interspersed in gaseous form between the molecules thereof.

According to another aspect of the invention, a neutron reactive gas is used to replace the inert gas within the volumes A and C. Boron trifluoride ($BF_3$), when used in this connection, lends itself either to continuous current type detection with ionization chamber equipment or to pulse type detection as in U.S. Patent No. 2,483,139.

Figure 5:
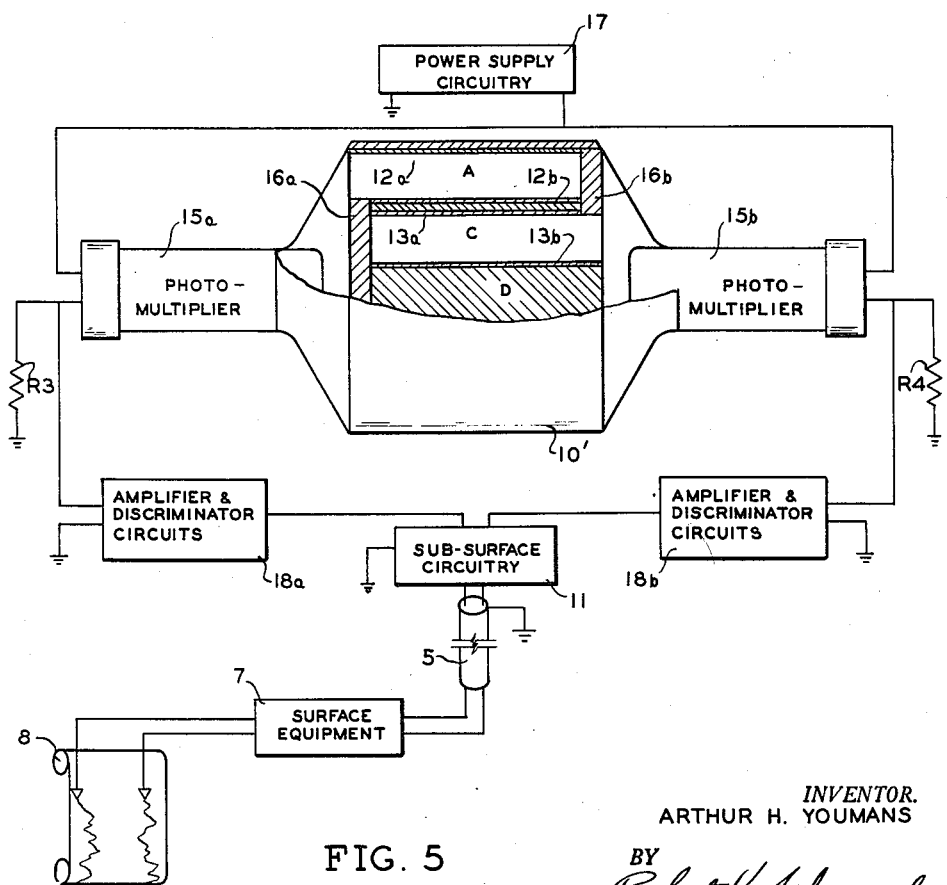
Figure 5 illustrates the structural details of the novel photomultiplier tubes and associated scintillation materials, as well as the circuitry and components employed therewith, in another embodiment of the invention.

Turning now to Figure 5, the utilization of the invention with scintillation material will now be described. The numeral 10' indicates a modified radiation detector, with photomultiplier tubes 15a and 15b secured respectively at opposite ends thereof. The respective neutron reactive coatings 12a and 12b are shown in volume A, as are the coatings 13a and 13b in volume C.

As earlier mentioned in this specification, it is preferable for the outer volume A to possess a negligible sensitivity to epithermal neutrons. The annular volume B should be characterized by neutron absorption and should not comprise a neutron moderator. However, the annular volume C may comprise a detector of thermal as well as epithermal neutrons. For such a detector, one preferred material is europium activated lithium iodide, LiI(Eu), used as a scintillation material. The efficiency of this material can be made even greater if the lithium used in making the crystal is enriched in the $Li^6$ isotope. Such operation is made possible by the fact that the lithium atoms within the crystal function to effectively moderate the epithermal neutrons within the crystal. Therefore, such a crystal may be substituted for both of the volumes C and D and coatings 13a and 13b.

Within the annular volumes A and C in Figure 5, there may be provided a gas capable of scintillating under neutron bombardment. For instance, such a gas may comprise argon, helium, xenon, neon, helium-3 and the like. If preferred, suitable mixtures of such gases may be employed.

If helium-3 is used, no neutron reactive coating is needed on the bounding surfaces of volumes A and C, since the helium-3 reaction with the neutrons produces high energy protons which produce scintillations in the gas.

Photomultiplier tube 15a is mounted in optical registry with the scintillation material within annular volume A. The photosensitive cathode of tube 15a is energized by photons within volume A. Conversely, scintillations within the volume C are prevented by opaque end shield 16a from illuminating photomultiplier 15a.

Photomultiplier 15b is mounted in optical registry with the scintillation material within annular volume C. Photions originating in volume C illuminate the photosensitive cathode of tube 15b. Conversely, opaque end shield 16b ensures that scintillations occurring elsewhere than in volume C do not illuminate photomultiplier tube 15b.

The photomultiplier tubes 15a and 15b are provided proper operating potential by power supply circuitry 17. The unit 17 may be located within either the surface or the subsurface equipment and is of conventional construction and operation. The output impulses from the respective detectors are developed as voltage pulses across output resistors R3 and R4, and applied, respectively, to the amplifier and discriminator circuits 18a and 18b. In these circuits the pulses are suitably amplified, and may be passed through conventional discriminators to eliminate the undesirable dark current and gamma ray pulses from the ultimate signal.

From the respective amplifier and discriminator circuits the pulses are applied to the subsurface circuitry 11. The unit 11 may include such conventional stages of circuitry as are found necessary or desirable in well logging pulse systems. In general, the subsurface circuitry 11 and surface equipment 7 are of the same character as that described in connection with proportional counter operation of Figure 4, and functions in the same manner as described in connection therewith.

Recorder means 8 is connected to receive the output of the surface equipment 7 and provide a record of data emanating therefrom in correlation with depth.

It should be stated that the various annular volumes included in any of the embodiments of the novel detector disclosed herein need not be cylindrically symmetrical. Such volumes may be arranged asymmetrically, if desired. With this mode of operation it is advisable to employ suitable decentralizing springs or the like to cause the downhole instrument to continuously maintain the same side of the detector adjacent to the wall of the well bore.

Moreover, it should be appreciated that by placing the substance in volume D external to the substance used in volume C, the neutron moderating means will encase the inner detector. This interchanging of the various annular elements such as volumes C and D is deemed to fall within the purview of the present invention.

Further, it will be appreciated that volume A need not be exclusively sensitive to thermal neutrons. In fact, it will almost certainly be somewhat sensitive to epithermal neutrons. It is therefore within the scope of the invention that volume A be somewhat sensitive to epithermal neutrons. What is important is that volume A be substantially sensitive to thermal neutrons and volume C substantially sensitive to epithermal neutrons.

While, therefore, I have disclosed my invention in accordance with the statute, it will be apparent that various modifications, substitutions and alterations may be readily made without departing from the spirit and scope of the appended claims.

I claim:

1. In a system for simultaneously detecting thermal and epithermal neutron flux, a detector comprising an innermost cylindrical volume of material adapted to attenuate the energy of neutrons incident thereon, a first annular volume filled with inert gas disposed about said innermost cylindrical volume, a second annular volume of high thermal neutron capturing cross section disposed around said first annular volume, a third annular volume filled with inert gas, neutron reactive means communicating with said inert gas in said first and third annular volumes, and means for detecting ionization in said first and third annular volumes.

2. In a system for simultaneously detecting thermal and epithermal neutron flux, a detector which comprises first and second gas volumes communicating with fissionable material and connected to generate electrical signals in response to neutron bombardment, slow neutron absorption means substantially incapable of neutron energy moderation interposed between said first and second gas volumes, and neutron energy attenuating means located radially adjacent to said second gas volume means.

3. In a system for simultaneously detecting thermal and epithermal neutron flux, a detector which comprises first and second gas volumes provided with neutron reactive gaseous material molecularly interposed therewithin and connected to generate electrical signals in response to neutron bombardment, thermal neutron absorption means substantially incapable of neutron energy moderation interposed between said first and second gas volumes, and neutron attenuating means located radially adjacent to said second gas volume.

4. In a system for simultaneously detecting thermal and epithermal neutron flux, a detector which comprises first and second thermal neutron sensitive means connected to generate a plurality of discrete electrical signals having magnitudes indicative of incident neutron bombardment, thermal neutron absorption means substantially incapable of neutron energy moderation interposed between said first and second neutron sensitive means, and neutron attenuating means located radially adjacent to said second neutron sensitive means.

5. A detector for simultaneously detecting thermal and epithermal neutrons in a bore hole which includes an outermost annular volume of scintillation material in communication with a neutron reactive material, a different annular volume of high thermal neutron capturing cross section material disposed concentrically within siad outermost volume, an innermost volume of neutron energy attenuating material, an intermediate annular volume of scintillation material disposed in communication with neutron reactive material and located between said innermost volume and said different volume of high capturing cross section material, a first photomultiplier mounted to observe scintillations occurring within said outermost volume, and a second photomultiplier mounted to observe scintillations occurring within said intermediate volume.

6. In a system for simultaneously and at substantially the same place detecting thermal and epithermal neutron flux separately, a detector which comprises epithermal neutron sensitive means producing a measurable output in response to epithermal neutron bombardment, thermal neutron absorption means substantially incapable of neutron energy moderation disposed about said epithermal neutron sensitive means, and thermal neutron sensitive means producing a measurable output in response to thermal neutron bombardment disposed about said thermal neutron absorption means.

7. In a system for simultaneously and at substantially the same place detecting thermal and epithermal neutron flux separately, a detector which comprises first thermal neutron sensitive means producing signals in response to thermal neutron bombardment, neutron energy attenuating means disposed adjacent to said first thermal neutron sensitive means, thermal neutron absorption means substantially incapable of neutron energy moderation disposed about said first thermal neutron sensitive means, and second thermal neutron sensitive means producing signals in response to thermal neutron bombardment disposed about said thermal neutron absorption means.

References Cited in the file of this patent

UNITED STATES PATENTS

| | | |
|---|---|---|
| 2,508,772 | Pontecorvo | May 23, 1950 |
| 2,543,676 | Thayer et al. | Feb. 27, 1951 |
| 2,667,583 | Herzog | Jan. 26, 1954 |
| 2,741,705 | McKay | Apr. 10, 1956 |
| 2,755,390 | Teichmann | July 17, 1956 |